United States Patent
Ko et al.

(10) Patent No.: US 9,889,729 B2
(45) Date of Patent: Feb. 13, 2018

(54) HYBRID DOOR FOR AUTOMOBILE

(71) Applicant: HYUNDAI MOTOR COMPANY, Seoul (KR)

(72) Inventors: Se Jin Ko, Anyang-si (KR); Young Hyun Oh, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/713,889

(22) Filed: May 15, 2015

(65) Prior Publication Data

US 2016/0176447 A1   Jun. 23, 2016

(30) Foreign Application Priority Data

Dec. 22, 2014 (KR) .................. 10-2014-0186100

(51) Int. Cl.
*B60J 5/04* (2006.01)
*B60J 10/08* (2006.01)
*B60J 10/80* (2016.01)

(52) U.S. Cl.
CPC ............ *B60J 10/08* (2013.01); *B60J 5/0415* (2013.01); *B60J 10/80* (2016.02)

(58) Field of Classification Search
CPC ................................ B62D 29/001; B60J 5/00
USPC ........................................................ 49/502
See application file for complete search history.

(56) References Cited

U.S. PATENT DOCUMENTS

| | | | | |
|---|---|---|---|---|
| 4,719,689 A * | 1/1988 | Yamamoto et al. ............ 29/458 |
| 4,738,560 A * | 4/1988 | Brussow et al. .............. 403/268 |
| 4,916,284 A * | 4/1990 | Petrick ..................... 219/121.64 |
| 5,470,416 A * | 11/1995 | Herring et al. ............... 156/196 |
| 5,749,992 A * | 5/1998 | Eklund et al. ................ 156/212 |
| 6,000,118 A * | 12/1999 | Biernat et al. .................. 29/458 |
| 6,368,008 B1 * | 4/2002 | Biernat et al. ............... 403/267 |
| 6,478,915 B1 * | 11/2002 | Schmalbruch et al. ...... 156/216 |
| 6,523,244 B1 * | 2/2003 | Bissonnette .................... 29/509 |
| 6,696,147 B1 * | 2/2004 | Herring et al. ............... 428/323 |
| 6,749,254 B1 * | 6/2004 | Kleven et al. ................ 296/191 |
| 7,422,652 B2 * | 9/2008 | Ondrus et al. ............... 156/322 |
| 8,087,720 B2 * | 1/2012 | Wang ...................... 296/193.11 |
| 8,632,118 B2 * | 1/2014 | Song ............................ 296/154 |
| 8,895,132 B2 * | 11/2014 | Spencer ....................... 428/124 |
| 9,034,135 B2 * | 5/2015 | Schulenburg et al. ....... 156/216 |
| 9,121,424 B2 * | 9/2015 | Stefani et al. |
| 2001/0029702 A1 | 10/2001 | Heuel ............................ 49/502 |
| 2002/0073625 A1 * | 6/2002 | Jennings ........................ 49/502 |
| 2003/0067187 A1 * | 4/2003 | Curtiss et al. ............. 296/146.5 |

(Continued)

FOREIGN PATENT DOCUMENTS

JP      9-109683 A      4/1997
JP    2004-314731 A   11/2004

(Continued)

*Primary Examiner* — Jerry Redman

(74) *Attorney, Agent, or Firm* — McDermott Will & Emery LLP

(57) ABSTRACT

A hybrid door for an automobile, which can reduce the weight of an automobile while maintaining high strength and dent includes an outside panel configured to have a sandwich structure in which a resin layer is integrated between at least one pair of thin steel plates and disposed outside an automobile interior, and an inside panel bonded to the outside panel and disposed within the automobile interior.

4 Claims, 4 Drawing Sheets

(56) References Cited

U.S. PATENT DOCUMENTS

| | | | |
|---|---|---|---|
| 2003/0134963 A1* | 7/2003 | Miyoshi | C08L 71/123 524/495 |
| 2003/0139518 A1* | 7/2003 | Miyoshi | C08L 71/123 524/495 |
| 2004/0060240 A1* | 4/2004 | Fellner | 49/349 |
| 2004/0216386 A1* | 11/2004 | Chernoff et al. | 49/502 |
| 2004/0216387 A1* | 11/2004 | Furuse | 49/502 |
| 2004/0245676 A1* | 12/2004 | Zaluzec et al. | 264/294 |
| 2005/0150166 A1* | 7/2005 | Seksaria et al. | 49/352 |
| 2006/0020077 A1* | 1/2006 | Miyoshi | C08L 71/123 524/495 |
| 2006/0265963 A1* | 11/2006 | Winborn | 49/502 |
| 2007/0066721 A1* | 3/2007 | Kramer et al. | 523/400 |
| 2007/0199248 A1* | 8/2007 | Rieder et al. | 49/502 |
| 2008/0096036 A1* | 4/2008 | Bharadwaj | B05D 5/00 428/546 |
| 2009/0045650 A1* | 2/2009 | Endo et al. | 296/187.12 |
| 2009/0163626 A1* | 6/2009 | Ukei | B32B 27/06 524/99 |
| 2009/0309073 A1* | 12/2009 | Takagi | C08L 77/02 252/511 |
| 2010/0175329 A1* | 7/2010 | Perez Madueno et al. | 49/502 |
| 2011/0011005 A1* | 1/2011 | Halliwell et al. | 49/502 |
| 2011/0014356 A1* | 1/2011 | Fornes | C09D 5/24 427/58 |
| 2011/0023373 A1* | 2/2011 | Yasuhara et al. | 49/502 |
| 2011/0099912 A1* | 5/2011 | Ohtake et al. | 49/502 |
| 2012/0248811 A1* | 10/2012 | Song et al. | 296/76 |
| 2013/0249748 A1* | 9/2013 | Togura | H01Q 1/22 343/713 |
| 2014/0255608 A1* | 9/2014 | Eibon et al. | 427/380 |
| 2014/0284102 A1* | 9/2014 | Ichikawa | B60R 16/0215 174/72 A |
| 2015/0259774 A1* | 9/2015 | Yan et al. | |
| 2015/0376754 A1* | 12/2015 | Yan et al. | |
| 2016/0044834 A1* | 2/2016 | Hansen | H05K 9/00 174/2 |

FOREIGN PATENT DOCUMENTS

| | | |
|---|---|---|
| JP | 2010-076555 A | 4/2010 |
| JP | 2013-116691 A | 6/2013 |
| KR | 10-20140083781 A | 7/2014 |

* cited by examiner (a)

(b)

“HYBRID DOOR FOR AUTOMOBILE

CROSS-REFERENCE(S) TO RELATED APPLICATIONS

The present application claims priority to Korean Patent Application No. 10-2014-0186100, filed Dec. 22, 2014, the entire contents of which is incorporated herein by reference for all purposes.

BACKGROUND

Field

Exemplary embodiments of the present invention relate to a hybrid door for an automobile in which the inside panel and outside panel are made of different types of materials; and, particularly, to a hybrid door for an automobile which can reduce the weight of the automobile while maintaining high strength and a dent-resistant property.

Description of Related Art

In the car manufacturing industry, weight of the chassis of an automobile continues to be reduced for reducing carbon dioxide included in emissions in accordance with environment regulations, improving fuel efficiency of fossil fuel vehicles, and reducing the battery consumption of electric vehicles.

FIG. 1 is an exploded perspective view of a known automobile door.

As illustrated in FIG. 1, in general, an automobile door basically includes an inside panel and an outside panel. The inside panel is chiefly formed of a 28K steel plate, and the outside panel is chiefly formed of a 35K steel plate.

Specific gravity of the steel plate is about 7.8 and is problematic in that the steel plate has shortcomings, such as a reduction of fuel efficiency in the automobile, because steel plate increases weight of the door.

In particular, in accordance with extreme carbon dioxide regulation policies, in the case of parts using thin steel plates, such as the door, the hood, and the trunk whose reduction of weight may be no longer expected, as known steel plates for automobiles having high strength, car manufacturers try to gradually adopt nonferrous-series light materials, such as aluminum, plastic, and magnesium, instead of the steel materials.

However, the nonferrous-series light materials are problematic in that they are expensive and require additional cost in order to improve welding and painting properties.

There has recently been proposed a method of manufacturing a thin steel plate using a high strength steel plate, such as dual phase (DP) steel having both machinability and strength, for example, 490DP or 590DP, and applying the thin steel plate to automobile parts in order to reduce the weight of automobile parts through designs resulting in reduced thickness.

The method of reducing the thickness of steel plate has a disadvantage in that reduction in thickness is limited because part strength is reduced if the thickness of the steel plate becomes too thin. As a result, reduction of weight in the automobile door using a high-strength thin steel plate is limited.

Accordingly, there is an urgent need to develop materials for reducing weight of the automobile door while retaining hardness and dent-resistance that are equal to or greater than those of conventional steel plates in order to improve fuel efficiency of an automobile and cope with enforced environment regulations.

SUMMARY

An embodiment of the present invention is directed to the provision of a hybrid door for an automobile, which is capable of maintaining high strength and dent-resistance, reducing its weight, and reducing the weight of an automobile.

Furthermore, an embodiment of the present invention is directed to the provision of a hybrid door for an automobile, which is capable of minimizing deviation in dimension precision although the inside and outside doors are made of different materials.

In accordance with an embodiment of the present invention, a hybrid door for an automobile includes an outside panel configured to have a sandwich structure in which a resin layer is integrated between at least one pair of thin steel plates and disposed outside an automobile room and an inside panel bonded to the outside panel and disposed within the automobile room.

The thin steel plate has tensile strength of 35 kgf/mm$^2$ or more and a thickness of 0.2~0.3 mm.

The thin steel surface is composed of Al—Zn—Mg coating layer in order to prevent galvanic corrosion.

The resin layer has a thickness of 0.3~0.5 mm and made of conductive resin.

In accordance with an embodiment of the present invention, the end of the outside panel may be configured to surround the end of the inside panel and subject to hemming bonding with the inside panel. The hybrid door may further include a hemming sealer formed at the end of the inside panel in such a way as to absorb thermal deformation of the inside panel made of aluminum due to a temperature.

DESCRIPTION OF SPECIFIC EMBODIMENTS

Figure 1:
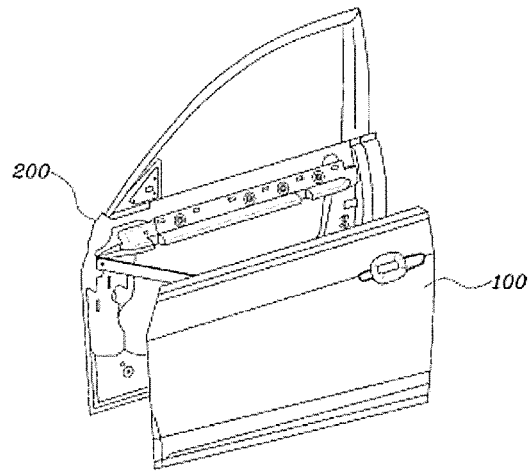
FIG. 1 is an exploded perspective view of a known automobile door.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

A hybrid door for an automobile in accordance with an embodiment of the present invention includes an outside panel 100 configured to have a sandwich structure and disposed outside an automobile room and an inside panel 200 bonded to the outside panel 100 and disposed within the automobile room.

Figure 2:
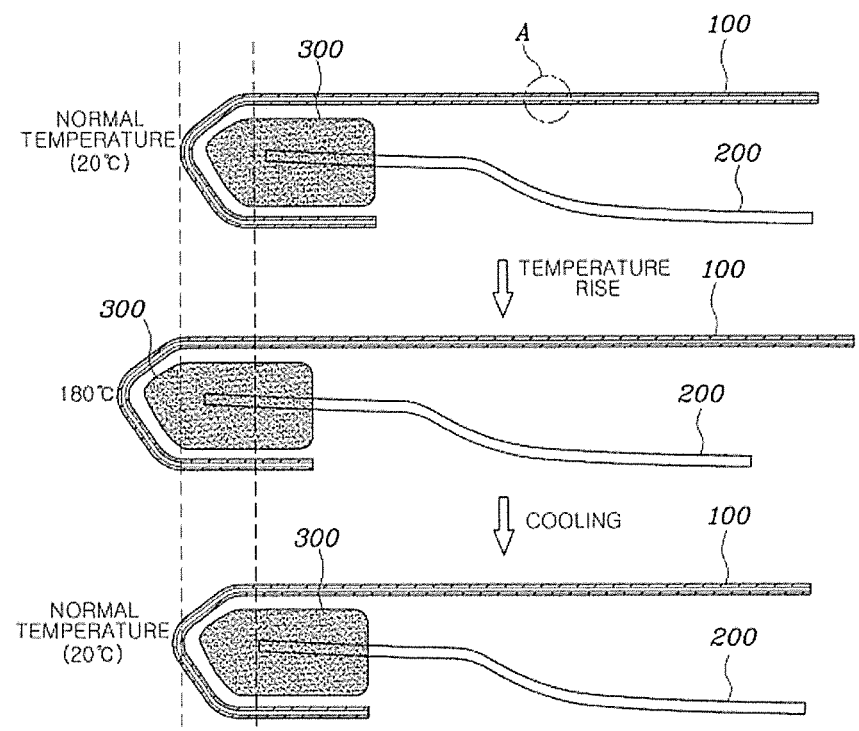
FIG. 2 is a diagram illustrating the coupling of the outside panel and the inside panel in accordance with an embodiment of the present invention.

FIG. 2 illustrates a cross section of the outside panel in accordance with an embodiment of the present invention.

As illustrated in FIG. 2, the outside panel 100 may have a sandwich structure in which the resin layer 120 is integrated with and formed between at least one pair of thin steel plates 110.

The reason for this is that weight of the outside panel is reduced compared to that of an outside panel fabricated using a conventional steel plate, thereby being capable of improving fuel efficiency and performance of an automobile.

The thin steel plate 110 may have tensile strength of 35 kgf/mm² or more and a thickness of 0.2~0.3 mm.

In this case, the same hardness and dent-resistance as the conventional outside panel 100 fabricated using a 35K steel plate having tensile strength of 35 kgf/mm² and a thickness of 0.7 mm can be secured, the amount of materials used in the outside panel can be reduced, and a reduction of weight can also be satisfied.

Furthermore, the thin steel plate 110 may be subject to Al—Zn—Mg plating. In this case, the plated layer may be limited to Al: 3~10 wt %, Mg: 5 wt % or less (0 excluded).

The reason is as follows. In the hybrid door for an automobile in accordance with an embodiment of the present invention, the outside panel 100 and the inside panel 200 are coupled by hemming bonding. If the outside panel 100 and the inside panel 200 are made of different types of metal materials as described above, galvanic corrosion attributable to a unique potential difference between the different types of metal materials can be prevented.

The resin layer 120 disposed between the pair of thin steel plates 110 may have a thickness of 0.3~0.5 mm and may be made of conductive resin.

The reason for this is that an adhesive property can be secured so that the resin layer 120 is not detached in a process of performing metal processing, such as press, roll forming, and shaping, on the outside panel 100 and dot welding is also possible.

In this case, the resin layer 120 may be made of metal powder, mixed resin, such as graphite powder, polyacetylene that is an organic substance, or polyaniline-series electrical conductive resin.

Furthermore, as described above, the thickness of the thin steel plate 110 is limited to 0.2~0.3 mm, and the thickness of the resin layer 120 is limited to 0.3~0.5 mm. The reason is as follows. In general, the outside panel for an automobile door has a thickness of about 0.6~0.8 mm. In an embodiment of the present invention, the outside panel has the sandwich structure having a thickness equal to or smaller than about 0.6~0.8 mm in order to secure hardness and a dent property and also achieve a reduction of weight.

Figure 3:
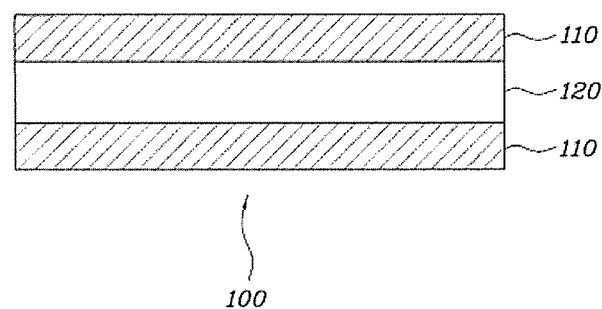
FIG. 3 is a cross-sectional view of “A” in FIG. 2.
Figure 4A:
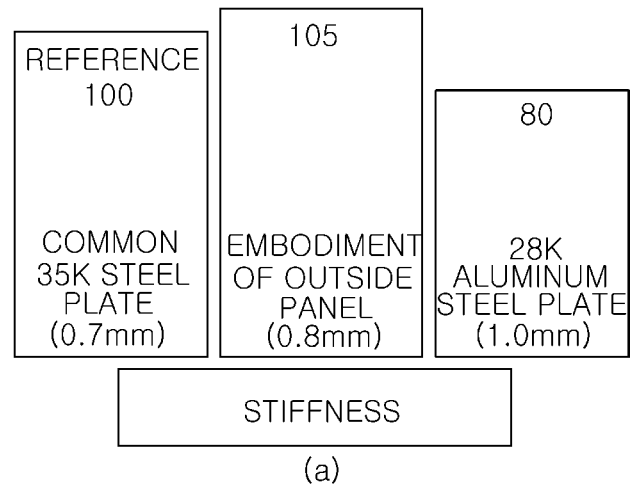
FIGS. 4A to 4D are graphs illustrating a comparison of hardness, dent-resistance, weight, and the prime cost between the outside panel in accordance with an embodiment of the present invention and comparison materials.
Figure 4B:
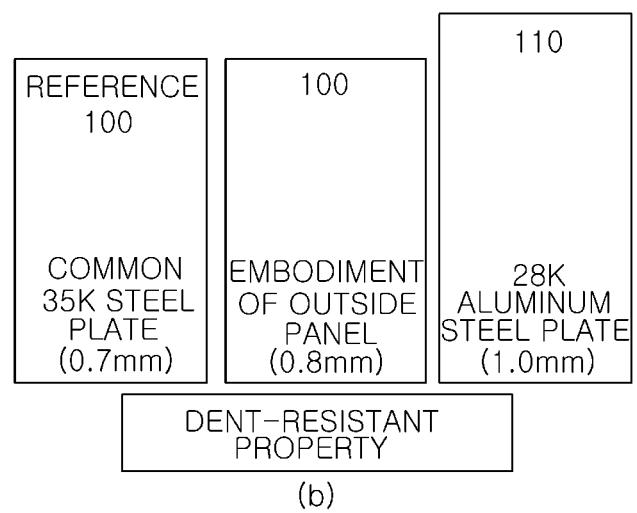
Figure 4C:
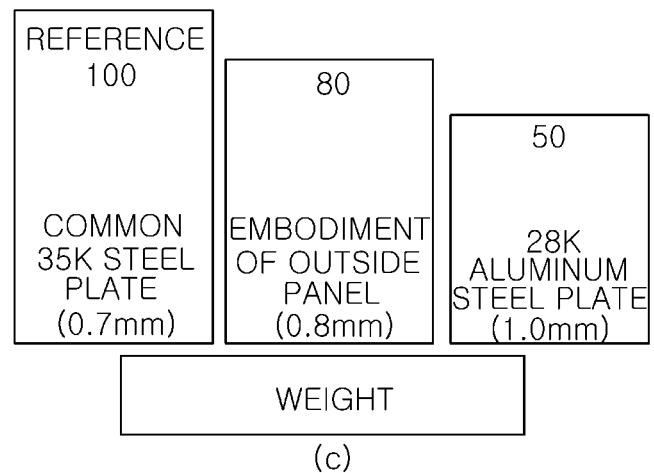
Figure 4D:
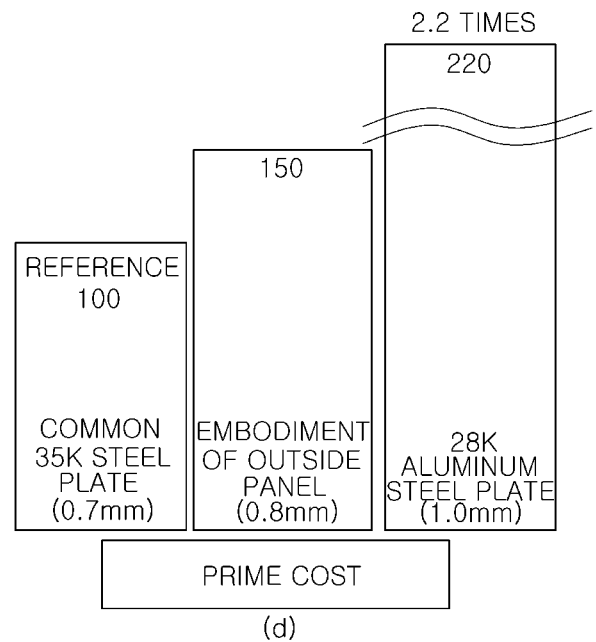

FIG. 3 is a diagram illustrating the coupling of the outside panel and an inside panel in accordance with an embodiment of the present invention.

As illustrated in FIG. 3, in the hybrid door, the outside panel 100 is configured to surround the end of the inside panel 200 and subject to hemming bonding with the inside panel 200.

In an embodiment of the present invention, the inside panel 200 is made of aluminum materials. The linear coefficient of expansion of aluminum is 2.34×10⁻⁶/° C. whereas the linear coefficient of expansion of the outside panel 100 is 11.7×10⁻⁶/° C., which is about half that of the inside panel 200.

Accordingly, assuming that the size of a door is 1000 mm×800 mm in length and width, when a temperature of 180° C. rises, the outside panel 100 is expanded about 0.9 mm only in one direction, whereas the inside panel 200 is expanded about 1.8 mm only in one direction. Accordingly, a margin of 0.9 mm or more is present in a hemming bonding portion between the outside panel 100 and the inside panel 200 in order to prevent a deformation, such as torsion attributable to temperature.

In the hybrid door for an automobile in accordance with an embodiment of the present invention, a hemming sealer 300 may be coated on the end of the inside panel 200.

The reason for this is that the aforementioned galvanic corrosion can be secondarily prevented because the inside panel 200 and the outside panel 100 do not come in contact with each other by coating the hemming sealer 300 on the end of the inside panel 200.

Furthermore, a deformation, such as the torsion of the door, can be prevented because thermal deformation attributable to a rise or fall of a temperature, such as upon insertion of the assembly into an electroplating tank, is absorbed.

FIGS. 4A to 4D are graphs illustrating a comparison of hardness, dent-resistance, weight, and the prime cost between the outside panel in accordance with an embodiment of the present invention and a 35K steel plate of 0.7 mm and a 28K aluminum steel plate of 1.0 mm.

As illustrated in FIGS. 4A to 4D, the outside panel 100 in accordance with an embodiment of the present invention can reduce weight of about 20% compared to the conventional 35K steel plate of 0.7 mm while securing hardness and dent-resistance equal to or greater than that of the 35K steel plate and can reduce the prime cost of about 40% compared to that of the conventional 28K aluminum steel plate of 1.0 mm.

In accordance with an embodiment of the present invention, there are advantages in that advance on the prime cost can be minimized, weight can be reduced compared to the 35K steel plate, hardness and dent-resistance are excellent, and the weight of an automobile can be reduced because the resin layer is bonded between the thin steel plates having a small thickness.

While the present invention has been described with respect to the specific embodiments, it will be apparent to those skilled in the art that various changes and modifications may be made without departing from the spirit and scope of the invention as defined in the following claims.

What is claimed is:

1. A hybrid door for an automobile, comprising:
   an outside panel having a sandwich structure in which a resin layer is integrated between at least one pair of steel plates and disposed outside an automobile interior; and
   an inside panel bonded to the outside panel and disposed within an automobile interior,
   wherein the resin layer is made of an electrically conductive resin,
   the steel plate has a thickness within a range of 0.2 to 0.3 mm,
   wherein an end of the outside panel surrounds an end of the inside panel and is hemming bonded with the inside panel, and the hybrid door further comprises a hemming sealer formed at an end of the inside panel to absorb a thermal deformation of the inside panel made of aluminum due to temperature.

2. The hybrid door of claim 1, wherein the steel plates have tensile strength of 35 kgf/mm² or more.

3. The hybrid door of claim 1, wherein the steel plates comprise an Al—Zn—Mg plated steel plate.

4. The hybrid door of claim 1, wherein the resin layer has a thickness of 0.3~0.5 mm.

\* \* \* \* \*